United States Patent [19]

Mosiman et al.

[11] 4,453,315

[45] Jun. 12, 1984

[54] GAUGE FOR CHECKING ANGULAR DISPOSITION OF VEHICULAR SPRING STRUTS

[76] Inventors: Charles A. Mosiman; William A. Deming, both of P.O. Box 1703, Beaverton, Oreg. 97075

[21] Appl. No.: 473,060

[22] Filed: Mar. 7, 1983

[51] Int. Cl.³ .............................................. G01B 3/38
[52] U.S. Cl. ........................... 33/181 AT; 33/180 AT; 33/203.18
[58] Field of Search ........... 33/181 AT, 180 AT, 203, 33/203.18, 203.19, 203.21, 288

[56] References Cited

U.S. PATENT DOCUMENTS

| | | | |
|---|---|---|---|
| 1,898,136 | 2/1933 | Miller et al. | 33/180 AT |
| 3,143,809 | 8/1964 | Parker | 33/180 AT |
| 3,854,216 | 12/1974 | Mosher | 33/181 AT |
| 4,407,073 | 10/1983 | Nilsson et al. | 33/203.18 |
| 4,416,064 | 11/1983 | Hurst | 33/180 AT |

OTHER PUBLICATIONS

Page 46 of Automotive Independent, May, 1982.

Primary Examiner—Willis Little
Attorney, Agent, or Firm—Eugene M. Eckelman

[57] ABSTRACT

An upright flat body member is provided on a gauge which is arranged to lie flatwise against a brake hub plate for positioning such body member precisely parallel with the brake hub plates. The body member has a depending portion with a positioning finger arranged for axial alignment with the wheel spindle. The body member also has an upper extension which supports a gauge member projecting perpendicular to the flat body member and arranged to determine the angular disposition of the upwardly extending portion of a spring strut relative to the flat body member. The gauge includes adjustable features to accommodate different models of struts.

7 Claims, 4 Drawing Figures

U.S. Patent  Jun. 12, 1984  4,453,315
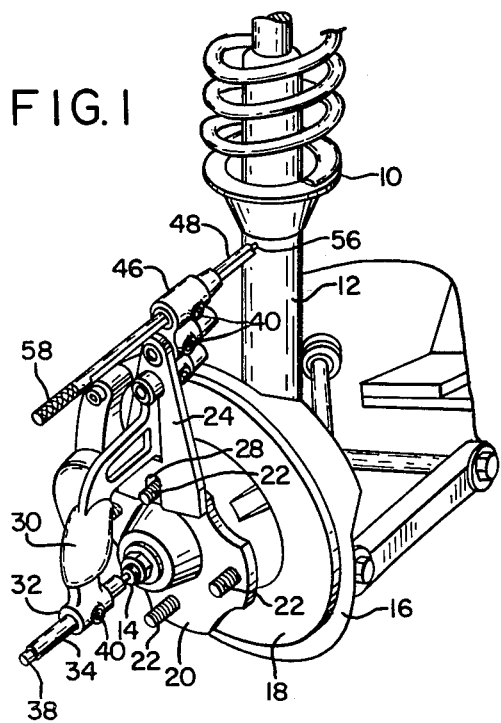
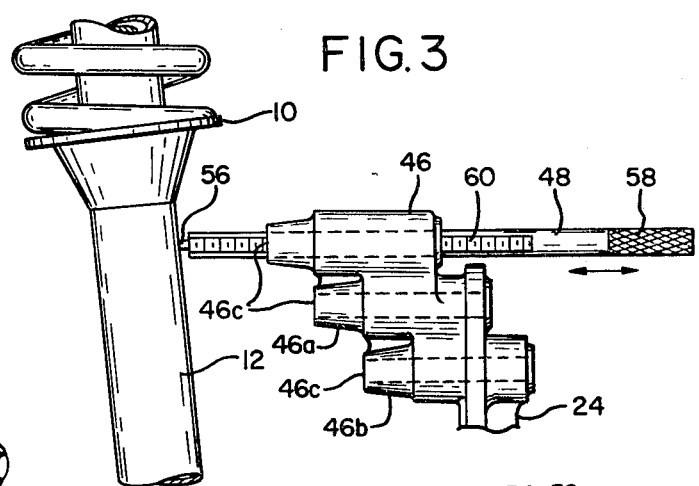
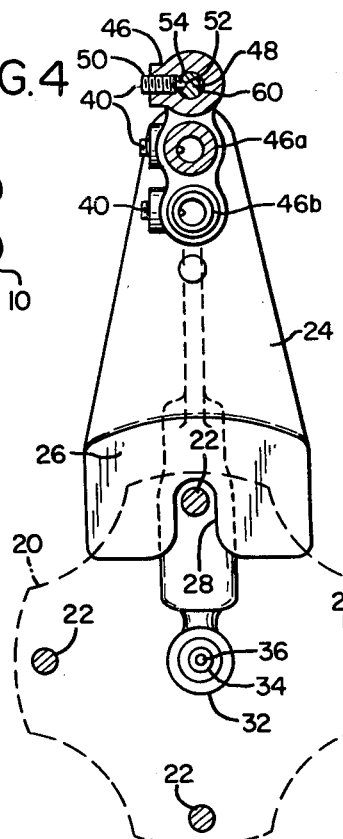
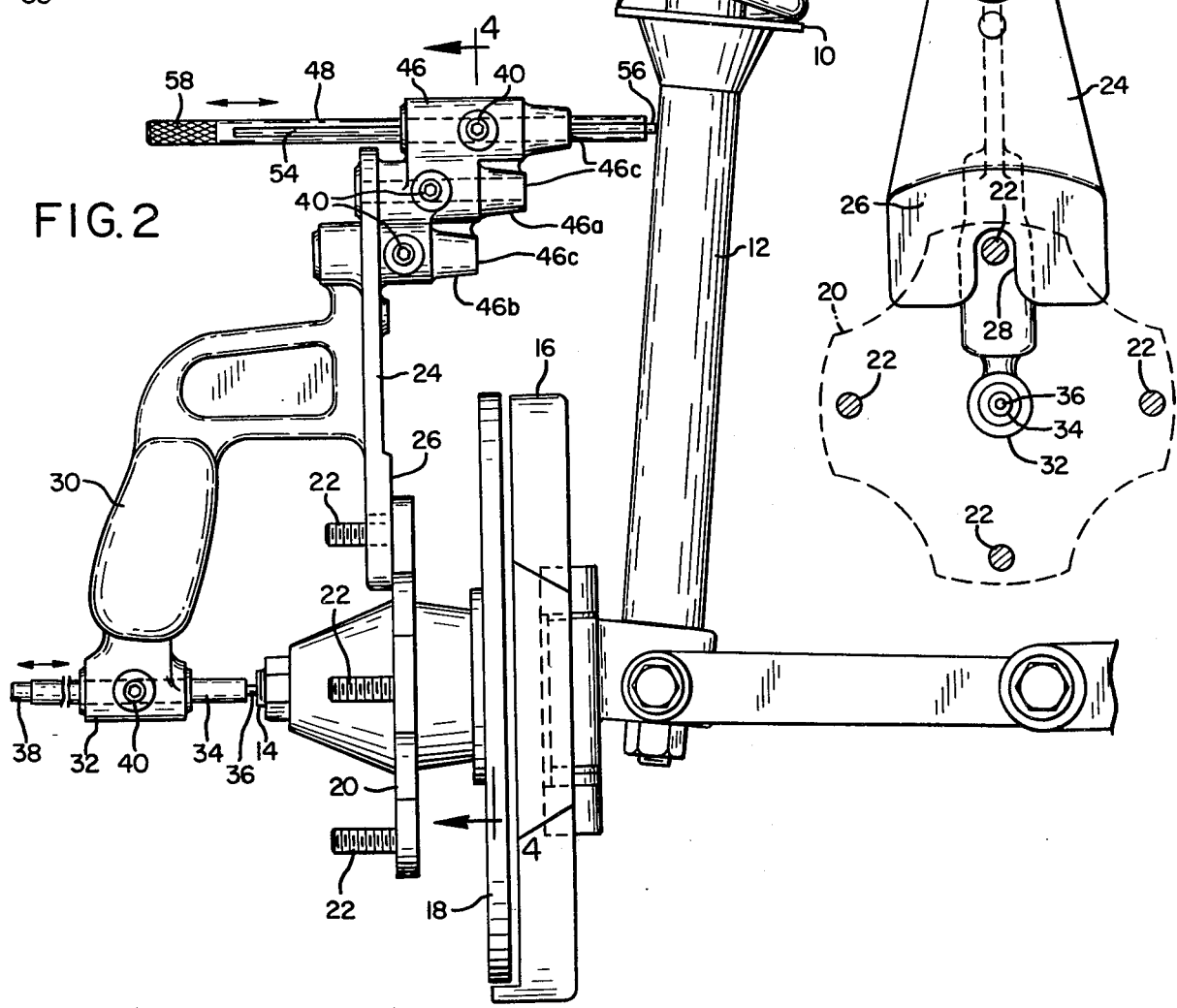

GAUGE FOR CHECKING ANGULAR DISPOSITION OF VEHICULAR SPRING STRUTS

BACKGROUND OF THE INVENTION

This invention relates to a new and useful improvement in a gauge for checking angular disposition of vehicular spring struts.

Many vehicles use spring struts which provide individual wheel suspension, a well known strut of this type being known as the MacPherson strut. Such a strut e, the specific angular disposition between the brake hub plate and the upwardly extending portion of the strut can be altered, thus providing an alignment which is out of the range of the manufacturer's recommended alignment. It is thus necessary for automotive repairmen to determine whether or not such angular disposition has taken place and if so the extent thereof.

SUMMARY OF THE INVENTION

According to the present invention and forming a primary objective thereof, a gauge for checking angular disposition of vehicular spring struts is provided that is simplified in structure, easy to use, and accurate in providing the desired reading.

In carrying out the objectives of the invention, the gauge comprises an upright flat body member a portion of which is arranged to lie flatwise against the brake hub plate for positioning it precisely parallel with the brake hub plate. The body member has a depending portion with a handle as well as positioning means arranged for axial engagement with the end of the wheel spindle. The body member also has an upper extension with adjustable finger means having graduations thereon arranged to determine the angular disposition of the upwardly extending portion relative to the flat body member. The gauge includes at least two mounting positions for the graduated finger means to accommodate different models of struts. The gauge also includes a slot in the flat body member to accommodate a wheel support stud to assist in placing the instrument on a wheel in a gauging function.

The invention will be better understood and additional objects and advantages will become apparent from the following description taken in connection with the accompanying drawings.

BRIEF DESCRIPTION OF THE DRAWINGS

FIG. 1 is a perspective view of the gauge of the invention as applied to a wheel and strut therefor for measuring the angular disposition of the wheel spindle relative to the strut;

FIG. 2 is an enlarged side elevational view of the present gauge and wheel assembly;

FIG. 3 is a fragmentary view taken similar to FIG. 2 but showing an opposite side of the gauge; and FIG. 4 is a sectional view of the gauge taken on the line 4—4 of FIG. 2.

DETAILED DESCRIPTION OF A PREFERRED EMBODIMENT

With particular reference to the drawings, the numeral 10 designates a conventional vehicular spring strut in common use, such as a MacPherson strut. This strut provides a spring suspension for wheel assemblies and includes an upwardly extending portion 12 integrally supporting a wheel spindle 14 in turn supporting a wheel assembly 16 which includes a brake rotor 18 and a brake hub plate 20. The hub plate has wheel support studs 22 thereon.

The present gauge is used for checking a conventional wheel and support assembly of the type described and comprises a body member 24 which includes a flat plate having a forward flat face portion 26. The bottom edge of body member 24 is provided with a slot or recess 28 centrally thereof arranged in use to receive one of the wheel support studs 22. The body member 24 has an integral handle 30 which extends rearwardly and downwardly below the bottom edge thereof. A socket member 32 is integrated with the bottom of the handle 30 and slidably supports a positioning finger 34 having reduced diameter tip ends 36 and 38. The finger 34 is of greater length than the socket member 32 and is arranged for axial adjustment. Tip ends 36 and 38 are of different diameters to accommodate the size and/or condition of the usual indentations in axle spindles, and the finger 34 can be turned end for end to direct the desired end toward the spindle.

Projecting forwardly from the body movement 26 at an upper portion thereof is support means 46 for a gauge finger 48. Two or more support means may be provided on the instrument to accommodate different strut models, such additional support means being designated by the numerals 46a and 46b. Each of these support means comprises a socket member arranged to slidably receive the gauge finger 48. Each of the socket members 32 and the support means 46, 46a and 46b is provided with a friction assembly 40 for the fingers 34 and 46, best seen in FIG. 3, which hold the slidable member in an adjusted position. Such friction assemblies comprise threaded inserts 50 mounted radially in the respective gauge portions and having a friction tip 52 engagable with the fingers. The finger 48 has an elongated slot 54 in which the friction tip 52 is engaged. While serving to hold the fingers in a set or adjusted position, the friction assemblies allow them to be forcefully adjusted axially. The engagement of the friction means 52 in the slot 54 of the finger hold the latter against rotation in their sockets. Gauge finger 48 has a tip end 56 at the front and a finger grip portion 58 at the rear. Gauge finger 48 has a uniform diameter, at least through one end thereof, and its slot 54 leads fully to one end so that it can be removed from one of the support means 46, 46a or 46b and transferred to another one of the support means.

Gauge finger 48 is provided with graduations or markings 60 on a surface portion thereof. The front edges of the support means 46, 46a and 46b, designated by the numeral 46c, comprise alignment means associated with the graduations 60 for taking readings from such graduations. Since the gauge finger 48 cannot rotate, its graduations 60 will always be maintained in the same area for convenient reading.

In a preferred construction of the instrument, the support means 46, 46a and 46b for the gauge finger 48 support such finger at an angle precisely perpendicular to the face portion 26 of the body member 24. The front edges 46a preferably are parallel with the face 26, and also the support means 32 for the positioning finger 34 supports the latter at an angle perpendicular to the face 26 of the body member. Although these relationships are not entirely necessary they contribute to simplicity of usage of the gauge and simplified specification values. The instrument is constructed also such that the finger 34, finger 48, and slot 28 are in upright alignment centrally of the instrument.

Graduations 60 on the finger 48 comprise readings which according to the manufacturer's specifications give the desired measurement of angular disposition between the upright portion 12 of the strut 10 and the spindle 14. Such graduations may give angular readings or linear readings but in any event designate said angular disposition. In the use of the tool, the wheel is removed and the tool applied as in FIG. 1. That is, the body member 24 is placed flat against the brake hub plate 20 and the positioning finger 34 is pushed forwardly such that a selected tip end 36 or 38 thereof engages the end of the spindle 14. Preferably the slot 28 is disposed over a wheel support lug 22, namely, the brake hub plate is first rotated such that one of the lugs 22 is aligned upright between the spindle 14 and the upright portion 12 of the strut. The gauge however can be used without this selected positioning of the hub plate 20 since it can be positioned against the hub plate between a pair of the wheel supporting studs. With the face 26 of the instrument held precisely against the face of the brake hub plate 20 and in the position as just described, the gauge finger 48 is moved outwardly such that the tip end thereof engages the upright portion 12 of the strut. A reading is then taken from the graduations 60, and according to handbook values, the repairman can determine if the angular disposition between the upright portion 12 and the spindle 14 are within the range recommended by manufacturer's specifications.

It is to be understood that the form of our invention herein shown and described is to be taken as a preferred example of the same and that various changes in the shape, size and arrangement of parts may be resorted to without departing from the spirit of our invention, or the scope of the subjoined claims.

Having thus described our invention, we claim:

1. A gauge for checking the angle between an upwardly extending portion of a vehicular spring strut and a wheel spindle supported on the strut having a brake hub plate extending perpendicular to the spindle, the brake hub plate having wheel support studs thereon, said gauge comprising (a) an upright flat body member arranged to lie flatwise against a brake hub plate for positioning it precisely parallel with the brake hub plate, a depending portion on said body member, positioning means on said depending portion arranged for alignment with the wheel spindle, an upper extension on said body member, and a gauge member on said extension projecting from said flat body member to determine the angular disposition of the upwardly extending portion of a spring strut relative to said flat body member.

2. The gauge of claim 1 wherein said gauge member is adjustable for use with different models of struts, and graduations thereon giving a reading of angular disposition of the upwardly extending portion of a spring strut relative to said flat body member.

3. The gauge of claim 2 wherein said upper extension includes at least two of said gauge members for accommodating different models of struts.

4. The gauge of claim 1 wherein said gauge member includes a tubular support, and a finger telescopically fitted in said tubular support for frictional slidable adjustment.

5. The gauge of claim 4 including graduations on said finger giving a reading of angular disposition of the upwardly extending portion of a spring strut relative to said flat body member.

6. The gauge of claim 1 wherein said depending portion includes a hand grip.

7. The gauge of claim 1 wherein said positioning means includes a tubular support, and a finger telescopically fitted in said tubular support for movement into abutment with the wheel spindle.

* * * * *